United States Patent
Suzuki

(10) Patent No.: US 8,599,286 B2
(45) Date of Patent: Dec. 3, 2013

(54) DISPLAY CONTROL APPARATUS, IMAGE PROCESSING APPARATUS, RECORDING MEDIUM ON WHICH A DISPLAY CONTROL PROGRAM IS RECORDED AND RECORDING MEDIUM ON WHICH AN IMAGE PROCESSING PROGRAM IS RECORDED

(75) Inventor: Shigeto Suzuki, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 167 days.

(21) Appl. No.: 13/012,930

(22) Filed: Jan. 25, 2011

(65) Prior Publication Data

US 2011/0181750 A1   Jul. 28, 2011

(30) Foreign Application Priority Data

Jan. 27, 2010   (JP) ................................ 2010-015583

(51) Int. Cl.
*H04N 5/262* (2006.01)
*H04N 5/222* (2006.01)

(52) U.S. Cl.
USPC ..................................... 348/239; 348/333.01

(58) Field of Classification Search
USPC ........ 348/222.1, 239, 333.01, 333.02, 333.11
See application file for complete search history.

(56) References Cited

U.S. PATENT DOCUMENTS

| 7,469,054 | B2 | 12/2008 | Aratani et al. |
| 7,657,157 | B2 | 2/2010 | Okabayashi et al. |
| 8,270,809 | B2 * | 9/2012 | Ubillos .......................... 386/248 |
| 2005/0140802 | A1 * | 6/2005 | Nam ............................ 348/239 |

FOREIGN PATENT DOCUMENTS

| JP | 2005-182196 A | 7/2005 |
| JP | 2005-204021 A | 7/2005 |
| JP | 2006-157324 A | 6/2006 |
| JP | 2006-279939 A | 10/2006 |
| JP | 2007-158703 A | 6/2007 |
| JP | 2008-042256 A | 2/2008 |
| JP | 2008-084213 A | 4/2008 |
| JP | 2009-69684 A | 4/2009 |
| JP | 2009-141678 A | 6/2009 |

OTHER PUBLICATIONS

Japanese Office Action dated Aug. 27, 2013 (and English translation thereof) in counterpart Japanese Application No. 2010-015583.

* cited by examiner

*Primary Examiner* — Timothy J Henn
(74) *Attorney, Agent, or Firm* — Holtz, Holtz, Goodman & Chick, PC

(57) ABSTRACT

The display control apparatus according to the present invention displays on a display unit, in a prescribed order, multiple images respectively expressing multiple image data acquired by an image data acquisition unit. For a predetermined portion of the images in the multiple images displayed on the display unit, image processing is performed to change the style of the images and the images are then displayed on the display unit.

9 Claims, 8 Drawing Sheets

FIG.5

IMAGE PROCESS INFORMATION

| IDENTIFYING INFORMATION | SEQUENCE | STYLE TYPE | IMAGE PROCESSING RANGE |
|---|---|---|---|
| A | 20TH FRAME | OIL PAINTING STYLE | ±4 FRAMES |
| B | 10TH FRAME | COLLAGE STYLE | -6 FRAMES |

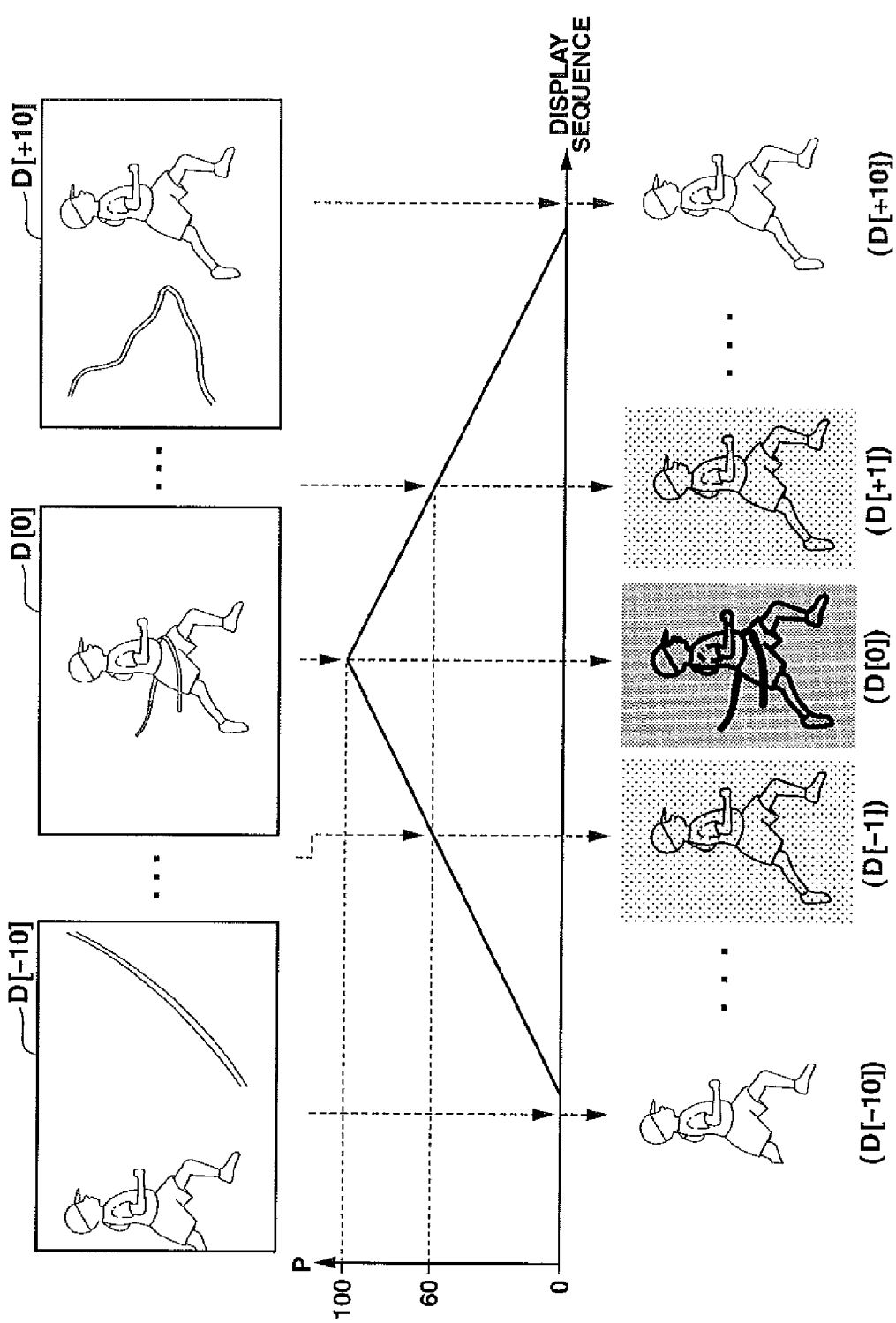

DISPLAY CONTROL APPARATUS, IMAGE PROCESSING APPARATUS, RECORDING MEDIUM ON WHICH A DISPLAY CONTROL PROGRAM IS RECORDED AND RECORDING MEDIUM ON WHICH AN IMAGE PROCESSING PROGRAM IS RECORDED

CROSS-REFERENCE TO RELATED APPLICATION

This application claims the benefit of Japanese Patent Application No. 2010-015583 filed Jan. 27, 2010, the entire disclosures of which are incorporated by reference herein.

FIELD

This application relates generally to a display control apparatus, an image processing apparatus, a recording medium on which a display control program is recorded and a recording medium on which an image processing program is recorded.

BACKGROUND

Unexamined Japanese Patent Application KOKAI Publication No. 2008-42256 discloses an image display method for continuously displaying images which includes a related image extraction process for extracting multiple related images, a shooting information acquisition process for acquiring shooting information related to each of the images extracted by the related image extraction process, and a display format determination process for determining the display format of the individual images on the basis of the shooting information for each image acquired by the shooting information acquisition process.

SUMMARY

However, in the image display method disclosed in this Patent Literature, it is impossible to make predetermined images such as images in which the user has an interest prominent in an image group composed of multiple images.

In consideration of the foregoing problems, it is an object of the present invention to provide a display control apparatus, an image processing apparatus, a display control program and an image processing program that can make predetermined images prominent among an image group displayed in succession on a display unit.

In order to achieve the above object, the display control apparatus according to a first aspect of the present invention includes:

an image data acquisition unit for acquiring multiple image data; and a display control unit for displaying on a display unit in a predetermined display sequence multiple images expressed by the multiple image data;

wherein the display control unit performs image processing to change the style of the images on a predetermined portion of the images out of the multiple images displayed on the display unit.

In order to achieve the above object, the image processing apparatus according to a second aspect of the present invention includes:

an image data acquisition unit for acquiring multiple image data; and an image processing unit that performs image processing to change the style of the images on a predetermined portion of the images out of the multiple images expressed by multiple image data, on the basis of multiple image data acquired by the image data acquisition unit.

In order to achieve the above object, the recording medium according to a third aspect of the present invention records a display control program that causes a computer to function as:

an image data acquisition unit for acquiring multiple image data; and a display control unit for displaying on the a display unit in a prescribed display sequence multiple images expressed by multiple image data, on the basis of multiple image data acquired by the image data acquisition unit;

wherein the display control unit performs image processing to change the style of the images on a predetermined portion of the images out of the multiple images displayed on the display unit.

In order to achieve the above object, the recording medium apparatus according to a fourth aspect of the present invention records an image processing program that causes a computer to function as:

an image data acquisition unit for acquiring multiple image data; and an image processing unit that performs image processing to change the style of the images on a predetermined portion of the images out of the multiple images expressed by multiple image data, on the basis of multiple image data acquired by the image data acquisition unit.

With the display control apparatus, the image processing apparatus, the display control program and the image processing program according to the present invention, it is possible to make predetermined images prominent among an image group displayed in succession on a display unit.

BRIEF DESCRIPTION OF THE DRAWINGS

A more complete understanding of this application can be obtained when the following detailed description is considered in conjunction with the following drawings, in which:

FIG. 5 shows one example of the contents of image processing information created by a display control apparatus according to an embodiment of the present invention;

FIG. 7A shows a portion of each image (for images in which the style is changed, the original image prior to the change) comprising an image group displayed as a slide show on the display unit;

FIG. 7B is an exemplary graph showing the relationship between the display number displayed on the display unit and the degree of change P when the image style is changed in accordance with display number;

FIG. 7C is a drawing used to explain which images undergo image processing paying attention to the person who is the main subject in the original images;

DETAILED DESCRIPTION

A display control apparatus according to an embodiment of the present invention is described below with reference to the drawings.

The present invention is not limited by the below embodiment and drawings, and naturally it is possible to add alterations (including the deletion of constituent elements) to the below embodiment and drawings. In addition, description of commonly known technical items that are not important are appropriately omitted in the explanation below to facilitate understanding of the present invention.

Figure 1:
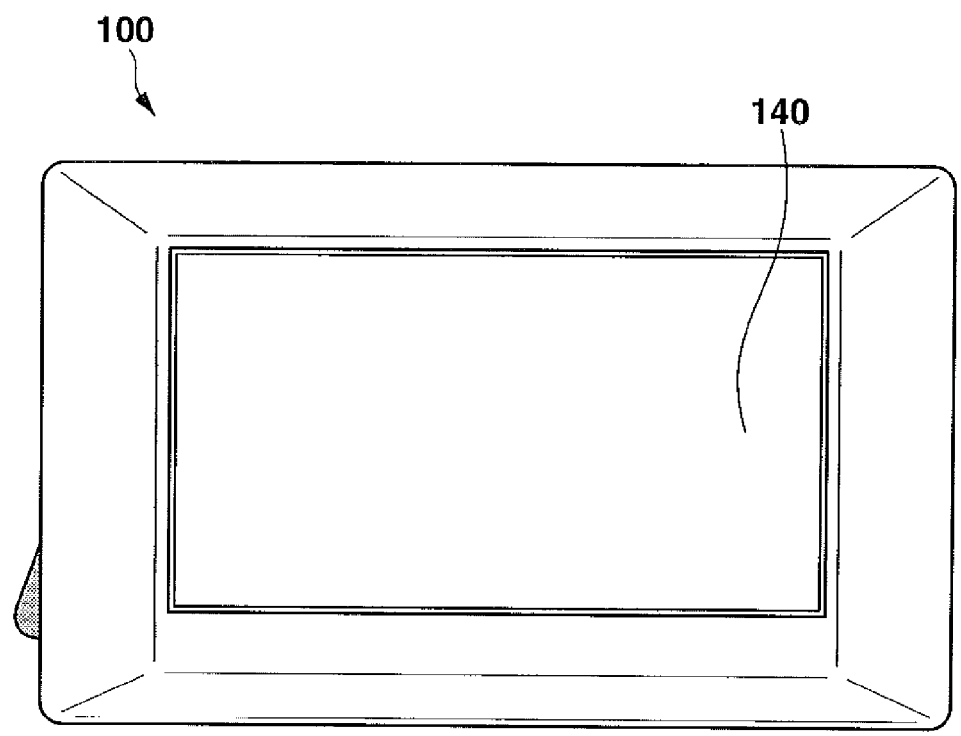
FIG. 1 shows the external appearance of a display control apparatus according to an embodiment of the present invention.

First, the composition of a display control apparatus according to the present embodiment is described with reference to FIGS. 1 to 3.

The display control apparatus according to the present embodiment is a digital photo stand (one example of a display apparatus) for displaying digital photographs. The display control apparatus 100 includes a display panel (display unit 140) in a housing imitating a photo frame, as shown in FIG. 1.

Figure 2:
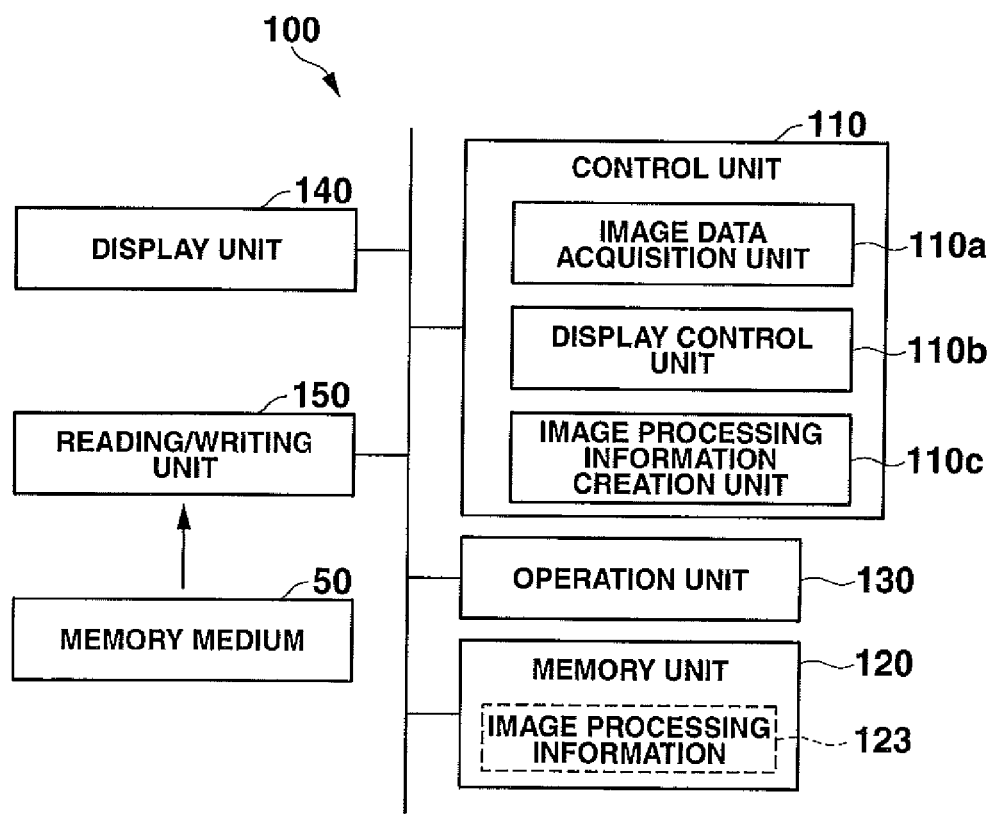
FIG. 2 is a block diagram showing the composition of a display control apparatus according to an embodiment of the present invention.

The display control apparatus 100 includes a control unit 110, a memory unit 120, an operation unit 130, a display unit 140 and a reading/writing unit 150, as shown in FIG. 2.

The control unit 110 controls the display control apparatus 100 as a whole. The control unit 110 is equipped with an image data acquisition unit 110a, a display control unit 110b and an image processing information creation unit 110c. The image data acquisition unit 110a and the display control unit 110b execute a below-described display control process. The image processing information creation unit 110c executes a below-described image processing information creation process.

Figure 3:
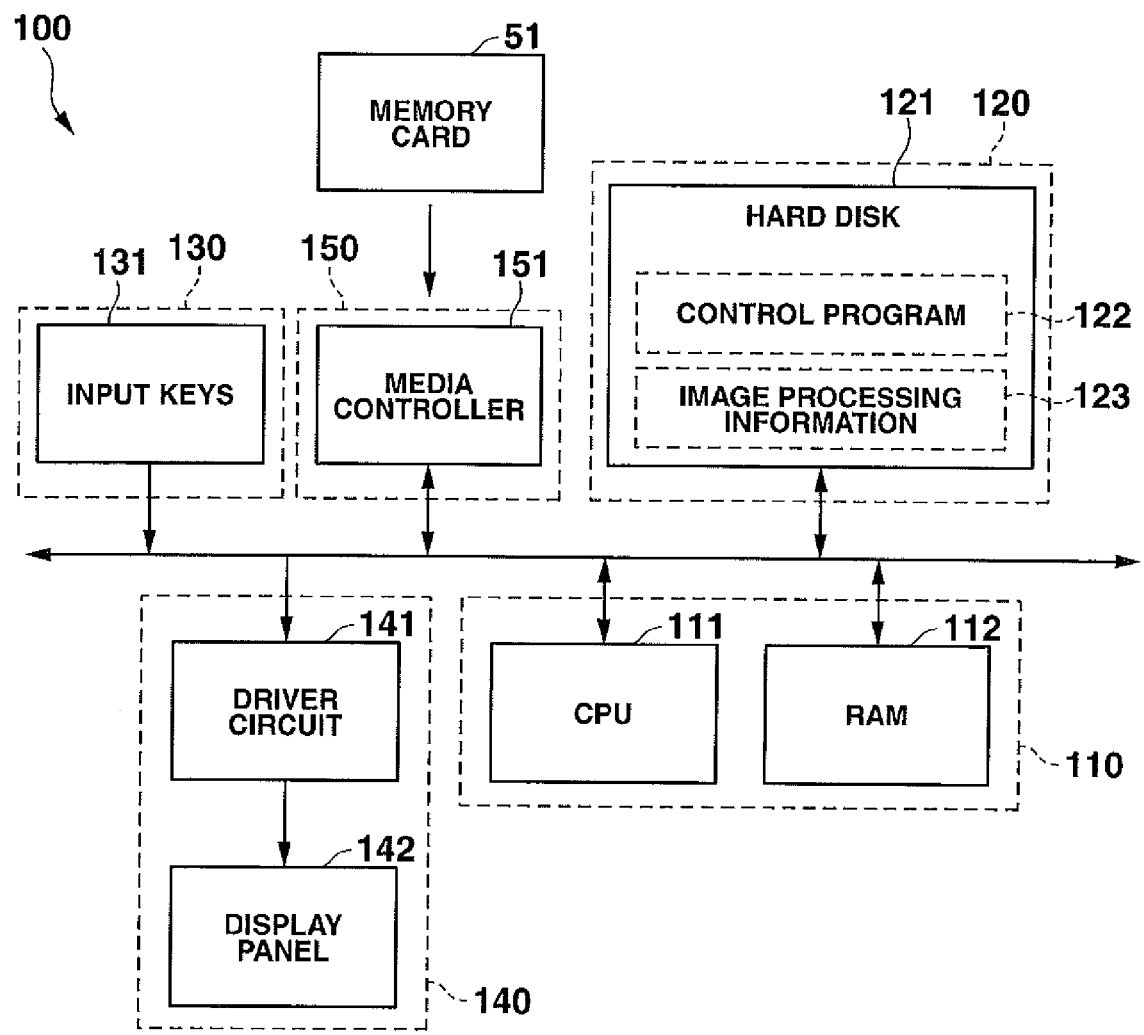
FIG. 3 is a hardware composition diagram for a display control apparatus according to an embodiment of the present invention.

The control unit 110 (in particular, the image data acquisition unit 110a, the display control unit 110b and the image processing information creation unit 110c) include, for example, a CPU (Central Processing Unit) 111 and RAM (Random Access Memory) 112 (see FIG. 3).

The CPU 111 controls the display control apparatus 100 as a whole in accordance with a control program 122, and executes the below-described display control process executed by the image data acquisition unit 110a and the display control unit 110b, and the image processing information creation process executed by the image processing information creation unit 110c. The control program 122 is recorded on a below-described hard disk 121 and is read with a predetermined timing into the RAM 112. The CPU 111 executes the aforementioned processes on the basis of commands in the control program 122 read into the RAM 112. At least a portion of the control unit (the image data acquisition unit 110a, the display control unit 110b and the image processing information creation unit 110c) may be composed of various specialty circuits (for example, an encoder for compressing image data, a decoder for uncompressing image data, and so forth). In this case, the various specialty circuits execute a portion of the processes the CPU 111 executes.

The RAM 112 functions as a working memory for the CPU 111. Data used and created by the CPU 111 during processes is temporarily stored in the RAM 112. Data input to and output from the CPU 111 is temporarily stored in the RAM 112.

The memory unit 120 appropriately stores data used or created by the control unit 110 during processes and image data read from a memory medium 50 by the control unit 110. In addition, the memory unit 120 stores image processing information 123. The memory unit 120 may include, for example, a hard disk 121 (see FIG. 3). The aforementioned data (the image processing information 123 and the like) and a control program 122 and the like are stored on the hard disk 121. The memory unit 120 may also include other memory apparatuses, such as flash memory or the like.

The operation unit 130 receives user operations and supplies to the control unit 110 operation signals in accordance with the received operations. The operation unit 130 includes, for example, input keys 131 (see FIG. 3). The input keys 131 output as an operation signal an ON signal or the like in accordance with pressing operations from the user. The input keys 131 are composed, for example, of one or more keys that function as keys having predetermined functions.

The display unit 140 displays images, operation screens and the like on the basis of display data supplied from the control unit 110. The display unit 140 includes, for example, a driver circuit 141 and a display panel 142 (see FIG. 3). Display data is supplied to the driver circuit 141 under control by the CPU 111. The driver circuit 141 drives the display panel 142 on the basis of the supplied display data, and causes images expressing the display data, operation screens and the like to be displayed on the display panel 142. The display panel 142 is composed of a liquid crystal panel, an organic EL (Electro Luminescence) panel or the like.

The reading/writing unit 150 reads data (for example image data) from and writes data to the memory medium 50. The reading/writing unit 150 is realized by a media controller 151, for example. The media controller 151 reads data from and writes data to a memory card 51.

The memory medium 50 stores various types of data. The memory medium 50 records image data that is data expressing photographic images (for example, digital photographs) shot by a digital camera. The memory medium 50 is realized by the memory card 51. The memory card 51 uses memory such as flash memory and stores various types of data. The memory medium may be, for example, an MD (Mini Disc), a CD (Compact Disc), a DVD (Digital Versatile Disc) or an MO (Magneto Optical disc).

Next, operation of the display control apparatus 100 is described. Here, groups (image data groups) composed of a predetermined number of image data are recorded on the memory medium 50 for each group. A collection of each image expressing the various image data comprising the image data group will hereafter be called an image group. The image data group is, for example, multiple still image data (continuously shot data), each expressing continuous still images obtained by continuous photography (continuously shot images). Each image data group is recorded on the memory medium 50 along with identifying data (for example, ID information data) that can designate the image data group. In addition, a display sequence for images expressed by the various image data in the image data groups is preset. Data (display sequence data) designating this display sequence is also recorded on the memory medium 50 along with the image data group. Furthermore, when the image data group has continuously shot data, data indicating this is also included in the image data group. This kind of data is appropriately created when continuously shot data is created through continuous shooting.

Figure 4:
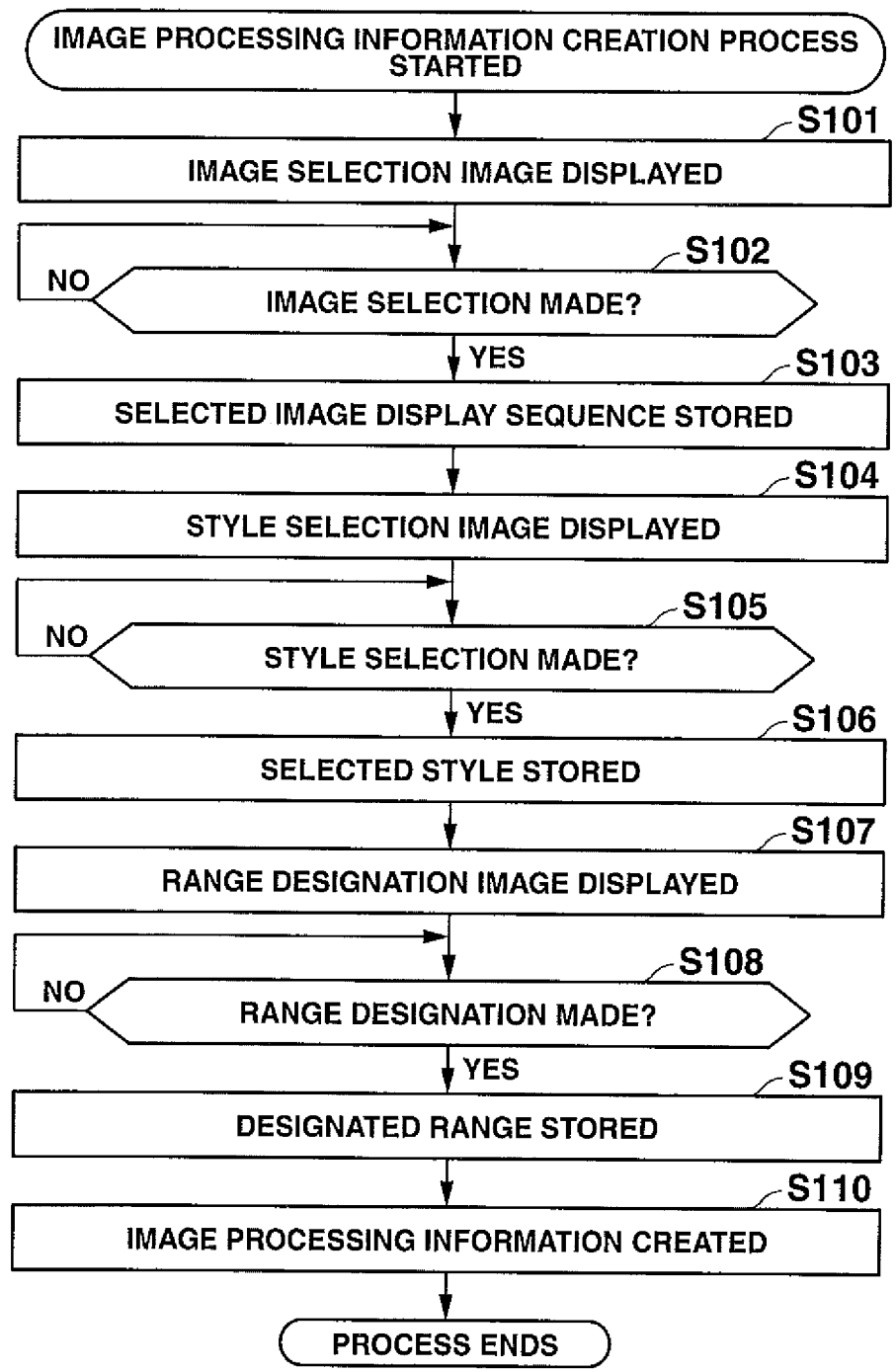
FIG. 4 is a flowchart of the image processing information creation process executed by a display control apparatus according to an embodiment of the present invention.

First, the image processing information creation process executed by the display control apparatus 100 is explained with reference to FIG. 4. This image processing information creation process starts when the user operates the operation unit 130 and specifies the creation mode for image processing information, and when an image group that will be the processing subject is specified. This image processing information creation process ends when the user operates the operation unit 130 and specifies another mode, even if this occurs during the process.

When the image processing information creation process starts, the image data acquisition unit 110a acquires in succession each image data comprising the image data group expressing the image group specified by the user from the memory medium 50 via the reading/writing unit 150. In addition, the image data acquisition unit 110a acquires the identifying data for this image group data and the display sequence data. The image data acquisition unit 110a reads image data from the memory medium 50 via the reading/writing unit 150, and acquires the image data through storage in the RAM 112. The image data acquisition unit 110a reads the identifying data and the display sequence data from the memory medium 50 via the reading/writing unit 150, and acquires the identifying data and the display sequence data through storage in the RAM 112.

The image processing information creation unit 110c creates display data expressing images (image selection images) including compressed images of each image (each image comprising the image group) expressed by each image data, for example, on the basis of the image data acquired in succession by the image data acquisition unit 110a. The image processing information creation unit 110c supplies the created display data to the display unit 140, and image selection images expressing this display data is displayed on the display unit 140 (step S101). Through this display of image selection images, the user is invited to select one of the images out of the image group. Even when one image is selected using the display sequence data acquired by the image data acquisition unit 110a, the image processing information creation unit 110c displays the image selection images on the display unit 140 in order to specify the sequence of displaying the selected images. The one image selected by the user is the image the user wants to change the style of and display on the display unit 140 (for example, an image in which the user is interested within the image group), and hereafter this image is called the climax scene.

Next, the image processing information creation unit 110c determines whether or not the user has selected a climax scene (step S102). When the user operates the operation unit 130 and selects a climax scene, the operation unit 130 supplies an operation signal in accordance with this selection to the image processing information creation unit 110c. The image processing information creation unit 110c determines that the user has not selected a climax scene if this kind of operation signal is not supplied (step S102; NO), and again executes the process of step S102. In this manner, the image processing information creation unit 110c waits until the user selects a climax scene. On the other hand, the image processing information creation unit 110c determines that the user has selected a climax scene if the above-described operation signal is supplied (step S102; YES). Furthermore, the image processing information creation unit 110c creates data indicating the sequence of displaying the image selected as the climax scene (in other words, the image specified as the climax scene) and stores this (temporarily stores this in the RAM 112) (step S103). In this manner, the image processing information creation unit 110c specifies the climax scene.

The image processing information creation unit 110c can specify the sequence of displaying each image in the image selection images and thus can create data indicating the sequence of displaying the specified images.

Next, the image processing information creation unit 110c creates display data expressing images inviting selection of style (style selection images). Style types are determined in advance and are style types the display control apparatus 100 can image process. The image data (template image data) that is the basis of this display data is stored in the memory unit 120 and the image processing information creation unit 110c acquires this image data from the memory unit 120 and creates the aforementioned display data. The image processing information creation unit supplies the created display data to the display unit 140, and displays the style selection images expressing this display data on the display unit 140. Through the display of these image selection images, the user is invited to select one style out of the types of styles the display control apparatus 100 can handle.

Next, the image processing information creation unit 110c determines whether or not the user as selected a style (step S105). When the user operates the operation unit 130 and selects a style, the operation unit 130 supplies an operation signal in accordance with that selection to the image processing information creation unit 110c. The image processing information creation unit determines that the user has not selected a style if this kind of operation signal is not supplied (step S105; NO), and again executes the process of step S105. In this manner, the image processing information creation unit 110c waits until the user selects a style. On the other hand, the image processing information creation unit 110c determines that the user has selected a style if the aforementioned operation signal is supplied (step S105; YES), and then creates and stores data indicating the selected style (step S106).

Next, the image processing information creation unit 110c creates display data expressing an image (range specifying image) for inviting the specifying of the range for changing the style of images in a number of frames before and after (here, before and after includes only before and only after) the climax scene. The range specifying image may be an image causing selection of one range from multiple predetermined ranges, or may be an image causing direct input by the user of the number of frames in the range (for example, 10 frames before and after). The image data (template image data) that is the basis of this display data is recorded in the memory unit 120, and the image processing information creation unit 110c acquires this image data from the memory unit 120 and creates the aforementioned display data. The image processing information creation unit 110c supplies the created display data to the display unit 140, and displays on the display unit 140 the range specifying image expressed by this display data (step S107). Through this display of the range specifying image, the user is invited to specify the range for changing the style of images for a number of frames before and after the climax scene.

Next, the image processing information creation unit 110c determines whether or not the user has specified the aforementioned range (step S108). When the user operates the operation unit 130 and selects the above-described range, the operation unit 130 supplies an operation signal in accordance with this designation to the image processing information creation unit 110c. The image processing information creation unit 110c determines that the user has not specified the above-described range if this kind of operation signal is not supplied (step S108; NO), and again executes the process of step S108. In this manner, the image processing information creation unit 110c waits until the user specifies the above-described range. On the other hand, the image processing information creation unit 110c determines that the user has specified the above-described range if the above-described operation signal is supplied (step S108; YES), and creates and stores data indicating the specified range (step S109).

Next, the image processing information creation unit 110c creates image processing information 123 on the basis of data indicating the sequence of displaying the climax scene, data indicating style, data indicating range and identifying information the image data acquisition unit 110a stores, preserved in the above-described processes, and records this in the memory unit 120 (step S110).

As described above, the image processing information creation unit 110c invites the user to select a climax scene by displaying the image selection images on the display unit 140, but the user may be invited to select a climax scene by successively displaying various images comprising the image group that is the subject of processing on the display unit 140 in accordance with the display sequence indicated by the display sequence data. In this case, the image processing information creation unit 110c creates successive display data on the basis of image data successively acquired by the image data acquisition unit 110a, supplies this to the display unit 140 and successively displays on the display unit images expressing each image data. The user operates the operation unit 130 when the image desired as the climax scene is displayed on the display unit 140. When an operation signal in accordance with this operation is supplied from the operation unit 130, the image displayed on the display unit 140 is specified as the climax scene, and data indicating the sequence of displaying the image selected as the climax scene is created on the basis of the sequence of the display of this image.

In addition, the image processing information creation unit 110c specifies the image selected by the user as the climax scene as described above, but the image processing information creation unit 110c may automatically specify the climax scene from among the image group. In this case, it is possible to use technology disclosed in Unexamined Japanese Patent Application KOKAI Publication No. 2006-279939, for example (technology extracting an image (corresponding to the climax scene) in which the user is interested from among continuously photographed images). In other words, the image processing information creation unit 110c may extract image data satisfying predetermined standards from among the various image data on the basis of each image data comprising the image data group, and automatically specify as the climax scene an image expressing this image data.

In addition, in the above description the style and range are specified through selection or designation by the user, but the style and range may be preset or may be specified at random. In such a case, data indicating the style and data indicating the range in the image processing information 123 become data indicating content set in advance or data indicating content specified at random.

The content of the image processing information 123 is described with reference to FIG. 5. The image processing information 123 is data in which data indicating content such as identifying information, sequence, style type, and image processing range and the like correspond to each other, and in FIG. 5, multiple image processing information 123 is recorded in the memory unit 120 as a database.

The identifying information is information for specifying the image data group and is indicated through the aforementioned identifying data.

The sequence is information indicating which frame the climax scene is in the image group, and is indicated by the aforementioned data indicating the sequence of the display of the climax scene.

The style type is information indicating the style type to which the image is converted in the below-described display control process and is specified through data indicating type. Various types are possible as this type, and details are described below.

The image processing range is information indicating on how many frames before and after the climax scene to perform image processing changing the style, with the climax scene as the standard, in the below-described display control process, and is displayed through data indicating the aforementioned range.

The image processing information 123 is referenced in the below-described display control process.

Figure 6:
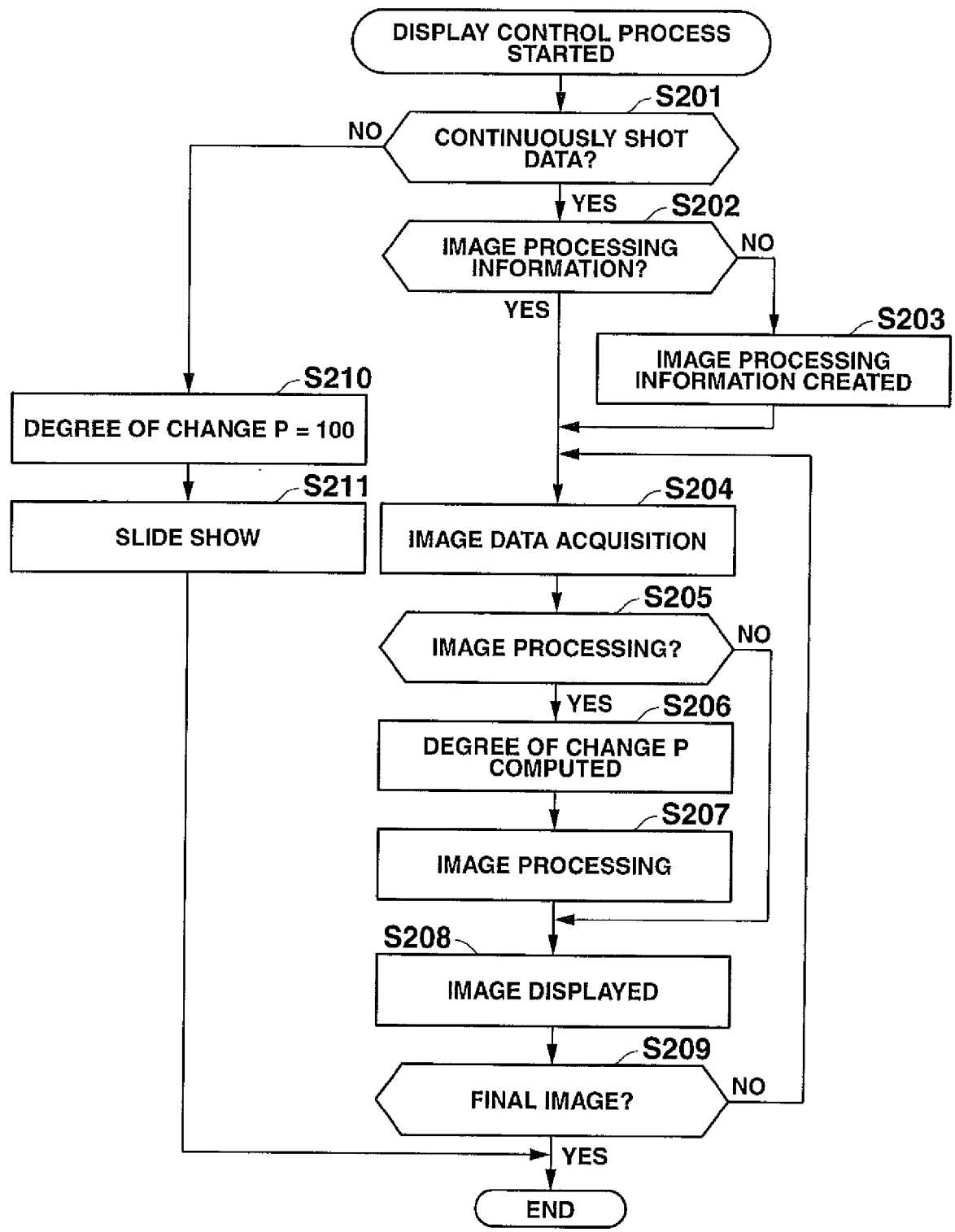
FIG. 6 is a flowchart of the display control process executed by a display control apparatus according to an embodiment of the present invention.

Next, the display control process executed by the display control apparatus 100 is described with reference to FIG. 6. In the display control process, the display control apparatus 100 executes a so-called slide show displaying each image comprising the image group on the display unit 140 at predetermined intervals. Furthermore, for the climax scene out of the image group displayed by the slide show, the display control apparatus 100 changes the style for the display. In addition, the display control apparatus 100 also changes the style of images in sequence within a predetermined range before or before and after the climax scene. At this time, the display control apparatus 100 causes the degree of change in style (the conversion strength to a different style) to differ between the climax scene and the other images. The style is the visual impression in the image. The style of the photo image is changed by a filter or the like used in the below-described graphics software or the like, and by changing the tone of the image. In other words, the image is changed from a photo image to the style of picture tone, monochrome tone or the like.

The change in style is executed by implementing image processing that changes the style on the image expressed by the image data. This kind of image processing is executed by image processing having the same effect as filters (art filters) and the like used with graphics software (so-called paint-type software (for example Photoshop: registered trademark)) that handles raster-format image data. With this image processing, various parameters are changed for the image expressed by the original image data, and for example an altered image such as an image with picture tone (water color style, collage style, India-ink painting style or the like) is created. The type of image processing in this case is arbitrary, and various image conversions that can be realized through executable image processing (for example, conversion to monochrome, conversion to sepia tone, conversion to soft focus tone, conversion to vivid tone, conversion to mosaic tone, conversion to miniature photo tone, etc.) can be applied.

The above-described parameters are various types of numbers used when implementing the image process. These parameters are numbers expressing image properties, and for example may be composed of a variety of image processes (a variety of changing styles) such as brightness, fineness of conversion, smoothness, or texture values. The values of this parameter are made to correspond to the degree of change in style. The degree of change is a value that measures the degree and strength with which the image conversion process is executed, and the extent of the change when compared to the image before and after image processing.

In addition, below an explanation is given for the change in style when the degree of change is P and the degree of change P in which the change in the image is optimal is a maximum m value of 100 (the maximum value of the value obtained as the degree of change P). The degree of change at which the change in the image is optimal is the degree of change at which the style of the image is changed to the best degree. Here, an image process is executed such that as the degree of change increases, the post-change image in this style gradually changes so that the post-change image gradually approaches the aforementioned image changed to the best degree. Furthermore, through image processing when the degree of change is the largest (here, 100), the style of the image is changed to the best degree. In other words, the degree of change P when at its largest corresponds to the parameter (optimum parameter) so that the style of the post-change image is changed to the best degree. What degree is the one at which the style is the best is determined by the subjectivity of the user, so the optimal parameter is a predetermined value set in advance (the user may appropriately change this). When P is 100, the parameter is the optimal parameter. In addition, when P is less than 100, image processing is executed using a parameter in which each number of the optimal parameter is multiplied by the number P/100. In this manner, image processing is executed in accordance with the degree of change P (parameter). The above-described parameter is, for example, a drawing parameter, and for example may be an image processing parameter used with Photoshop or the like.

In addition, the degree of change P changes based on which frame before and after the climax scene this is. Here, the method of computing this P is shown by equation (1) below. Here, z is the absolute value plus one of the numerical value of the range of the images on which image processing is performed (if the numerical value of the range of images is ±4, z=5). In addition, i is the absolute value of the difference between the sequence p of the image actually displayed (for example, the $20^{th}$ frame) and the sequence q of the display of the climax scene (for example, $18^{th}$ frame).

$$P=(z-i)\times 100/z \qquad (1)$$

In consideration of the foregoing, the display control process begins when the user operates the operation unit 130 and designates the slideshow display mode and also designates the image group that is the processing subject. This image control process is concluded, even during the process, when the user operates the operation unit 130 and designates another mode. In addition, when the image group is designated by the user, the image data acquisition unit 110a appropriately acquires the identifying data and the display sequence data from the memory medium 50 (and stores such in the RAM 112).

First, the image data acquisition unit 110a determines whether or not data indicating that the image data group has continuously shot data is included in the image data group expressing the designated image group. Through this, a determination is made as to whether or not the image data group expressing the designated image group is continuously shot data (step S201). At this time, the image data group of the processing subject recorded in the memory medium 50 is specified on the basis of the identifying data acquired by the image data acquisition unit 110a. When data indicating that there is continuously shot data is included in the image data group, the display control unit 110b determines that the image data group is continuously shot data (step S201; YES), and the process in step S202 is executed by the display control unit 110b. When this is not included in the step image data group, the display control unit 110b determines that the image data group is not continuously shot data (step S201; NO), and the process of step S210 is executed by the display control unit 110b.

In the process of step S202, the display control unit 110b determines whether or not image processing information is created for the designated image group. For example, the display control unit 110b executes the above-described determination by determining whether or not image processing information 123 containing identifying information (for example, identifying information "A" or "B" or the like in the image processing information of FIG. 5) indicated by identifying data in the memory unit 120 is recorded, on the basis of identifying data for the designated image data group (that the image data acquisition unit 110 acquired).

The display control unit 110b determines that the image processing information has been created when the above-described image processing information 123 is recorded (step S202; YES). In this case, the image data acquisition unit 110a executes the process of the next step S204. The display control unit 110b references this image processing information 123 in later processes by reading out and storing the aforementioned image processing information 123 in the RAM 112. On the other hand, when the aforementioned image processing information 123 is not recorded, the determination is that the image processing data 123 has not been created (step S202; NO), and the process of step S203 is then executed.

In the process of step S203, the display control unit 110b creates new image processing information. The content of the image processing information is the same as the above-described image processing information 123, and the sequence is the sequence of the last display, on the basis of the display sequence data (acquired by the image data acquisition unit 110a). Through this, the climax scene becomes the image displayed in the final sequence for convenience. In addition, content other than this is preset or set randomly. After the display control unit 110b executes the process of step S203, the image data acquisition unit 110a executes the process of step S204. In processes subsequent to this, image processing information created in the process of step S203 is considered the image processing information 123 and is stored in the RAM 112 and referenced.

As described above, through the image processing information 123, images in which the style is to be changed are specified from within the image group. Through this, the display control unit 110b changes the style of predetermined images out of the image group by referencing the image processing information 123 in subsequent processes.

As described above, images whose style should be changed are preset on the basis of operation of the operation unit 130 by the user, are automatically set by the display control apparatus 100 on the basis of the final image in the display sequence out of the multiple images (image group), or are automatically set by the display apparatus 100 on the basis of images satisfying preset standards out of the multiple images.

In the process of step S204, the image data acquisition unit 110a sets n=1. Furthermore, the image data acquisition unit 110a acquires (and reads out and stores in the RAM 112) the image data of the sequence of the display corresponding to n from the memory medium 50 via the reading/writing unit 150 in accordance with the display sequence indicated by the display sequence data (acquired by the image data acquisition unit 110a). At this time, the image data group that is the subject of processing recorded in the memory medium 50 is specified on the basis of the identifying data acquired by the image data acquisition unit 110a. The image data acquisition unit 110a executes the above-described process while incrementing n by one in the process of step S204 subsequently repeated. Through this, the image data acquisition unit 110a acquires the image data in accordance with the display sequence of the images. In addition, by repeating this step S204, the image data acquisition unit 110a acquires multiple image data, but the image data acquisition unit 110a may acquire the multiple image data all at once. In this case, each image data is stored so that the display sequence is understood. In addition, in this case after the determination YES is made in the below-described step S209, the process of step S205 is appropriately executed.

When the image data acquisition unit 110a acquires the image data, the display control unit 110b determines whether or not image processing is executed for the image data acquired by the image data acquisition unit 110a (step S205). The display control unit 110b executes image processing when the display sequence of the image indicated by the image data is within a predetermined range from the display sequence of the climax scene (step S205; YES), and does not execute image processing when this is not within the predetermine range (step S205; NO). This determination is made on the basis of the set n and the sequence and image processing range of the climax scene included in the image processing information 123 referenced by the display control unit 110b. For example, if the display control unit 110b determines that image processing is to be executed if the value of the n set by the image data acquisition unit 110a is within the range of (the sequence number plus the minimum number of the range of image processing) to (the sequence number plus the maximum number of the range of image processing) (step S205; YES), the process of step S206 is executed. On the other hand, if the display control unit 110b determines that image processing is not to be executed if the value of n is not within the aforementioned range (step S205; NO), the process of step S208 is executed.

For example, when the image data group that is the subject of processing has identifying information that is A or B in the image processing information 123 shown in FIG. 5, the sequence number is 20 if A and 10 if B. Hence, the minimum value of the range of image processing is −4 for A and −6 for B. In addition, the maximum value of the range of image processing is +4 for A and 0 for B. Consequently, the aforementioned range is 16 to 24 for A and 4 to 10 for B.

The display control unit 110b computes the degree of change P in the process of step S206. The display control unit 110b uses the aforementioned n and also computes P in reference to the image processing information 123 (step S206). As discussed above, the display control unit 110b computes P using the above-described equation (1). Here, z is the absolute value of the numerical value of the range of the image where image processing is executed plus one, so the absolute value of the numerical value of the range of image processing of the image processing information 123, plus one, is found. The image sequence p used in finding i in equation (1) is n, and the display sequence q of the climax scene is the numerical value of the sequence of the image processing information 123.

When the display control unit 110b computes the degree of change P, image processing is executed in accordance with the degree of change P on the basis of the nth image data acquired by the image data acquisition unit 110a (step S207). By performing this image processing, an image conversion is executed and an image of different style is created. In other words, image data expressing an image of different style is created and stored in the RAM 112. The display control unit 110b specifies the type of style changed by referencing the type of style in the image processing information 123, and executes image processing so as to create the specified type of style. The display control unit 110b, when performing image processing, executes the process of step S208.

The display control unit 110b executes an image display in the process of step S208. When the aforementioned image processing has been performed (when the determination is YES in the most recent step S205), the display control unit 110b creates display data on the basis of the image data after image processing and displays the image after image processing on the display unit 140 by supplying such to the display unit 140. In addition, when the aforementioned image processing is not performed (when the determination is NO in the most recent step S205), the display control unit 110b creates display data on the basis of the most recent image data acquired by the image data acquisition unit 110a and displays an image on which image processing has not been performed on the display unit 140 by supplying such to the display unit 140.

The display control unit 110b may wait for a prescribed time after displaying the image in the process of step S208. Through this, the timing of switching images displayed on the display unit 140 can be controlled.

When the display control unit 110b executes the process of step S208, the image data acquisition unit 110a determines whether or not the image currently displayed on the display unit 140 is the final image in the display sequence (step S209). This determination is made by referencing the display sequence shown by the display sequence data. Through this display sequence, it can be understood whether or not the image displayed on the display unit 140 is the final image. When the image data acquisition unit 110a determines that this is the final image (step S209; YES), the display control process ends. On the other hand, when the image data acquisition unit 110a determines that this is not the final image (step S209; NO), there are still images to be displayed, so the process of step S204 is again executed.

Through the above-described steps S204 through S209, the multiple images comprising the image group are successively displayed (slide show) on the display unit 140 on the basis of the image data group designated by the user.

The display control unit 110b in step S210 takes the degree of change P to be 100 and the image data acquisition unit 110a and the display control unit 110b perform a slide show (step S211). In this slide show, image displays are performed after image processing is performed with the degree of change P as 100 for all of the image data. For the slide show, the same processes as in step S204 and steps S207 through S209 are executed. Specifically, the image data acquisition unit 110a acquires image data comprising the image data group, and the display control unit 110b performs image processing on the acquired image data and creates display data on the basis of the image data that has undergone image processing. The display control unit 110b supplies the created display data to the display unit 140 and displays the images after image processing on the display unit 140. When the slide show ends, the display control process ends.

In the slide show in step S211, the image style is changed with the same degree of change for all images, and the images whose style was changed are successively displayed on the display unit 140. On the other hand, in the slide show performed in steps S204 through S209, the style of images whose display sequence is in a range (predetermined range) a predetermined number of frames before and after the sequence of the climax scene are changed. In addition, the degree of change in the style is greatest for the image of the climax scene.

In the above, when the image data group is continuously shot data, in other words when the image group successively displayed on the display unit 140 are continuous photographs obtained through continuous shooting, steps S204 through S209 were executed, but when the image group is not continuous photographs, steps S204 through S209 may be executed.

One example of the relationship between the images displayed on the display unit 140 through a slide show performed by the processes of steps S204 through S209 and the change in the degree of change P (when the range of image processing is before and after the climax scene so that the identifying information in the image information 123 is A) is explained with reference to FIG. 7. FIG. 7A shows a portion of each image comprising the image group displayed in the slide show on the display unit 140. Here, the original images prior to the style being changed are shown. FIG. 7B is a graph illustrating the relationship between the display sequence displayed on the display unit 140 and the degree of change P when the style is changed in accordance with the display sequence. FIG. 7C is used to explain on which images image processing has been performed, paying attention to the person that is the main subject in the original images.

In FIG. 7A, image D[0] is the climax scene. In addition, image D[−10] is the image 10 frames prior to the climax scene. In addition, image D[10] is the image 10 frames after the climax scene. The values inside the brackets [ ] adjoining D are numbers indicating how many frames before or after the climax scene (the same is true in FIGS. 7 through 9 below).

As shown in FIGS. 7A to 7C, in each image comprising the image group displayed in the slide show, images in a range a predetermined number before and after the climax scene are displayed on the display unit 140 with changed style (see FIG. 7C). Furthermore, as shown in FIGS. 7B and 7C, the closer to the climax scene, the greater the degree of change P becomes, with the degree of change P of the climax scene being the largest. Through this, the image of the climax scene has the best change in style. In FIG. 7B, when the degree of change P is 0, that image does not fall within the range where image processing is performed, so image processing is not performed on the image of the sequence at this time.

Figure 8A:
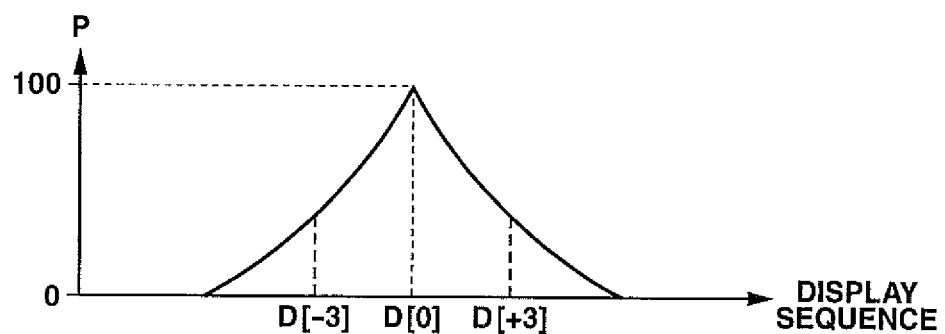
FIGS. 8A and 8B are other examples of graphs showing the relationship between the display number displayed on the display unit and the degree of change P when the image style is changed in accordance with display number.
Figure 8B:
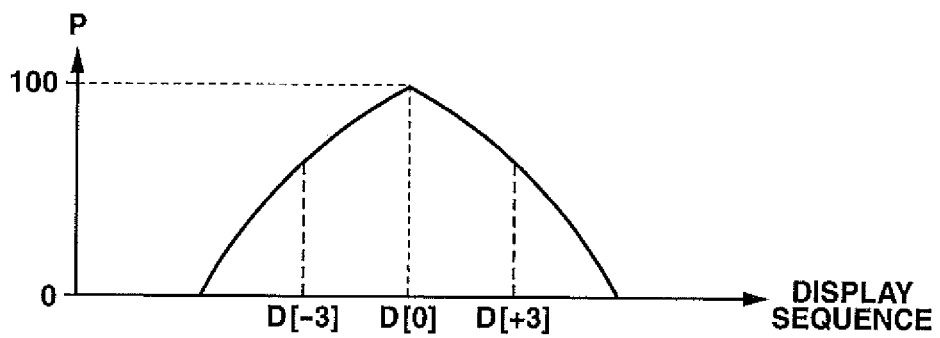

In the above description, the degree of change P and the display sequence have a linear relationship in the display sequence range where image processing is performed, but the relationship of fluctuation between the two may be curvilinear, as shown in FIG. 8A or FIG. 8B (this kind of fluctuation relationship is the same in the variation explained with FIG. 9). In this case, the equation (1) above becomes an equation as shown in FIG. 8A or FIG. 8B.

With the above composition, the display control unit 110*b* displays (in a slide show) on the display unit the multiple images (here, the image group) expressing the multiple image data in a predetermined display sequence on the basis of the multiple image data (here, the image data group) acquired by the image data acquisition unit 110*a*. Furthermore, the display control unit 110*b* performs image processing to change the style of the images on a predetermined portion of the images (here, images in a sequence inside a predetermine ranges before and after the display sequence of the climax scene) out of the multiple images displayed on the display unit 140, and displays on the display unit the images after image processing.

Through the above composition, a portion of the images out of the image group displayed successively in a slide show are displayed on the display unit 140 with their style changed, so this portion of the images can be made prominent compared to the other images. Through this, it is possible to cause predetermined images such as images in which the user has an interest to stand out in the image group successively displayed on the display unit 140. Through this, it is possible to impressively realize a portion of images including "the instant a goal is scored at an athletic meet" (FIG. 7), or "the instant the ball is kicked in soccer", or the like, in the image display (slide show), and to more effectively present the slide show. Furthermore, it is possible to make scenes in which the user has an interest stand out.

As described above, with display control unit 110*b* changes the style of the images by varying the degree of change so that the degree of change of the style of one image (the climax scene) out of the aforementioned portion of the images is the largest.

Figure 9A:
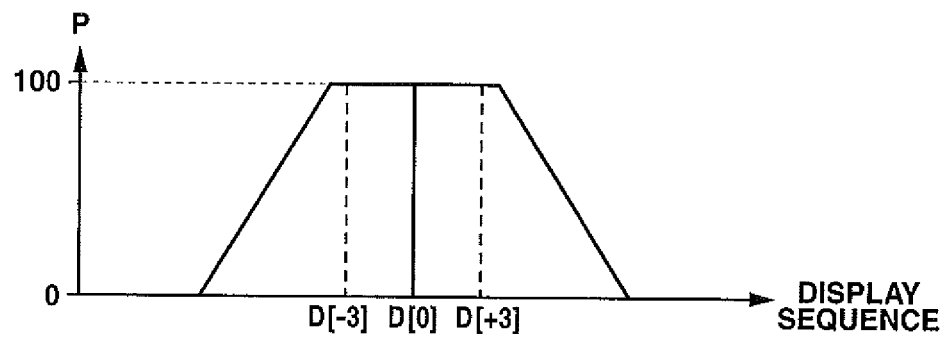
FIGS. 9A to 9C are other examples of graphs showing the relationship between the display number displayed on the display unit and the degree of change P when the image style is changed in accordance with display number.

There may be multiple images in which the degree of change in style is the largest. In other words, the display control unit 110*b* may change the style of the images by varying the degree of change so that the degree of change in the style of multiple images (climax scenes) out of the aforementioned portion of the images becomes the largest. For example, as shown in FIG. 9A, the degree of change P may be the largest for multiple images before and after the climax scene.

As discussed above, the display control unit 110*b* can cause a predetermined one or more images, such as images in which the user has an interest, to stand out by changing the style of the images and varying the degree of change so that the degree of change in the style of a one or more images (climax scenes) in a portion of the aforementioned images becomes the largest.

In addition, the above description is for the case when the image having the largest degree of change (the climax scene) has a display sequence in the middle of the aforementioned portion of the images (see the case in FIG. 7 when the identifying information in the image information 123 is A). In this case, the degree of change in the style gradually becomes larger approaching the climax scene and the degree of change in the style gradually becomes smaller after the climax scene is displayed, and through this an impressive display can be executed. Because the image (climax scene) with the largest degree of change may have a display sequence in the middle of the aforementioned portion of the images, the image with the largest degree of change may carry over multiple frames before and after the climax scene (see FIG. 9A). Through this, multiple frames of images including the climax scene can be made to stand out. Through this, an impressive image display can be executed.

The image with the largest degree of change need not be in the middle. For example, this image may come before or after in the display sequence. In addition, the degree of change in the degree of change P may differ between before and after the climax scene. Through this, an impressive image display can be executed.

In addition, in the above description there are cases in which the image with the largest degree of change has a display sequence that is the final image out of the portion of images and is the final image in the image group. In this case, the final image in the image group can be made to stand out.

Figure 9B:
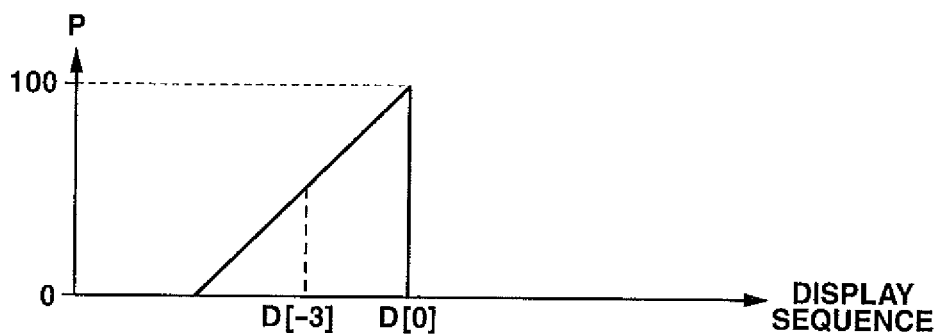

In addition, in the above description there are cases in which image processing is performed on images in a sequence in a predetermined range after the climax scene has passed, but the climax scene may be the final image (see the case in which the identifying information is the image information 123 is B). In other words, the image with the largest degree of change may be the image with the final display sequence out of the aforementioned portion of images, and images displayed thereafter may be displayed as original images on which image processing is not performed. For example, it is fine to not perform image processing on images in sequence after the climax scene, as shown in FIG. 9B. Through this, it is possible to give the user the impression of image processing being abruptly cancelled in the middle of the slide show, and it is possible to execute an impressive display. Here, the image with the largest degree of change may be the image with the final display sequence out of the aforementioned portion of the images, so images with the largest degree of change may carry over to multiple frames prior to the climax scene (see FIG. 9A). Through this, multiple frames of images including the climax scene are made to stand out.

Figure 9C:
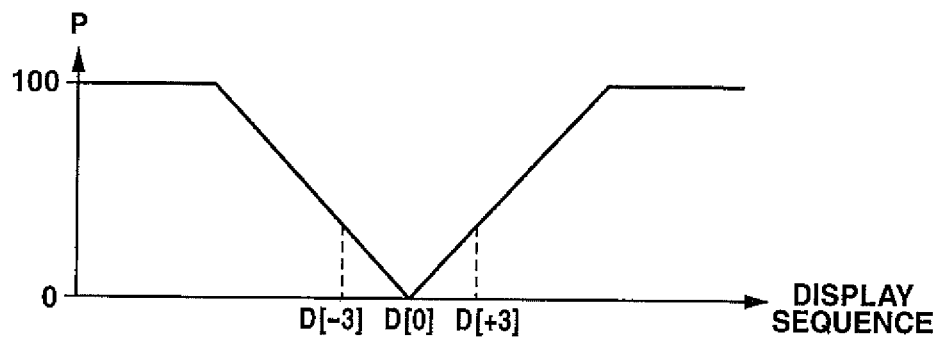

The display control unit 110b may also execute the opposite handling of the degree of change and image processing. For example, as shown in FIG. 9C, image processing making the degree of change the largest is performed on image data for images other than the aforementioned portion of images, and along with displaying the images after image processing, image processing need not be performed on the climax scene. Through this, the climax scene becomes an image differing from the other images and thus the climax scene can be made to stand out. In particular, by making the degree of change for the aforementioned portion of the images other than the climax scene be less than the largest, an impressive image display can be performed. In particular, by making the degree of change smaller the closer to the climax scene, a more impressive image display can be performed. Through this, the display control unit 110b may display on the display unit 140 a predetermined portion of the images (the images other than the above-described portion of images) out of multiple images displayed on the display unit 140 after performing image processing to change the style of the images.

In the above-described embodiment, image processing is performed when displaying images, but the image acquisition unit 110a and the display control unit 110b may perform image processing in advance by performing processes similar to those of steps S202 through S209. In this case, step S202 becomes recording of the image data on the memory medium 50 or in the memory unit 120. In this case, image data that has undergone image processing and image data that has not undergone image processing may be recorded as an image data group. Through this composition, it is possible to perform a slide show using this image data group without change, so the above-described slide show can be realized. In this case, the display control apparatus 100 becomes an image processing apparatus. In addition, the display control unit 110b becomes an image processing unit. The control program 122 becomes an image processing program.

In the above embodiment, the display apparatus was explained as a photograph display apparatus. However, the display apparatus is not limited to being a photograph display apparatus, and for example may be a digital camera or the like.

In addition, in the above embodiment the control program 122 was explained as one prerecorded on a computer-readable memory medium such as the hard disk 121. However, the program for causing the display control apparatus 100 to operate in whole or in part or for causing the above-described processes to be executed may be stored and distributed on a computer-readable memory medium such as a flexible disk, CD-ROM (Compact Disk Read-Only Memory), DVD (Digital Versatile Disk), MO (Magneto Optical disk) or the like, and this may be installed on a computer so that the above-described processes are executed on that computer.

Furthermore, the control program 122 may be stored on a disk apparatus a server apparatus on the Internet has, and for example may be overlaid on carrier waves and downloaded to a computer.

The display control apparatus 100 may be a digital camera, or a computer such as a personal computer or the like. When the display control apparatus 100 is a personal computer, the display control apparatus 100 may include the memory unit 120 and the display unit 140. The display control apparatus 100 in this case may be appropriately connected to an external memory unit, display unit or the like.

Having described and illustrated the principles of this application by reference to one preferred embodiment, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A display control apparatus, comprising:
an image data recording unit for recording multiple image data; and
a display control unit for displaying, on a display unit in a predetermined display sequence, multiple images based on the multiple image data recorded by the image data recording unit;
wherein the display control unit includes a style changing section that changes a visual style of the images by changing various parameters that characterize features of the images;
wherein the style changing section performs image processing to change the visual style of a predetermined number of the images, and the display control unit controls the display unit to display at least the predetermined number of the images having undergone the image processing; and
wherein the style changing section changes the visual style of each of the predetermined number of the images such that a degree of change in the visual style is different for each of the predetermined number of the images.

2. A display control apparatus comprising:
an image data recording unit for recording multiple image data; and
a display control unit for displaying, on a display unit in a predetermined display sequence, multiple images based on the multiple image data recorded by the image data recording unit;
wherein the display control unit includes a style changing section that changes a visual style of the images by changing various parameters that characterize features of the images;
wherein the style changing section performs image processing to change the visual style of a predetermined number of the images, and the display control unit controls the display unit to display at least the predetermined number of the images having undergone the image processing; and
wherein the predetermined number of the images is one of (i) set in advance based on an operation of an operation unit by a user, (ii) automatically set by the display control unit based on images satisfying a prescribed standard from among the multiple images, and (iii) automatically set by the display control unit based on an image whose display sequence is last from among the multiple images.

3. A display control apparatus, comprising:
an image data recording unit for recording multiple image data; and a display control unit for displaying, on a display unit in a predetermined display sequence, multiple images based on the multiple image data recorded by the image data recording unit;

wherein:

the display control unit includes a style changing section that changes a visual style of the images by changing various parameters that characterize features of the images;

the style changing section performs image processing to change the visual style of a predetermined number of the images, and the display control unit controls the display unit to display at least the predetermined number of the images having undergone the image processing;

the predetermined number of the images comprises multiple images; and the style changing section changes the visual style of the images by varying a degree of change so that the degree of change of the visual style is largest for at least one of the images from among the predetermined number of the images.

4. The display control apparatus according to claim 3, wherein the image with the largest degree of change has a display sequence in the middle of the predetermined number of the images.

5. The display control apparatus according to claim 3, wherein the image with the largest degree of change is last in a display sequence of the predetermined number of the images.

6. An image processing apparatus, comprising:

an image data recording unit for recording multiple image data; and an image processing unit that performs image processing of multiple images, wherein the multiple images are based on the multiple image data recorded by the image data recording unit;

wherein the image processing unit performs the image processing by changing various parameters that characterize features of the images, so as to change a visual style of a predetermined number of the images.

7. A non-transitory computer readable recording medium having a display control program recorded thereon, the program being executable to control a computer to function as units comprising:

an image data recording unit for recording multiple image data; and a display control unit for displaying, on a display unit in a predetermined display sequence, multiple images based on the multiple image data recorded by the image data recording unit;

wherein the display control unit is configured to (i) perform image processing by changing various parameters that characterize features of the images, so as to change a visual style of a predetermined number of the images, and (ii) control the display unit to display at least the predetermined number of the images having undergone the image processing; and wherein the display control unit changes the visual style of each of the predetermined number of the images such that a degree of change in the visual style is different for each of the predetermined number of the images.

8. A non-transitory computer readable recording medium having a display control program recorded thereon, the program being executable to control a computer to function as units comprising:

an image data recording unit for recording multiple image data; and a display control unit for displaying, on a display unit in a predetermined display sequence, multiple images based on the multiple image data recorded by the image data recording unit;

wherein the display control unit is configured to (i) perform image processing by changing various parameters that characterize features of the images, so as to change a visual style of a predetermined number of the images, and (ii) control the display unit to display at least the predetermined number of the images having undergone the image processing; and wherein the predetermined number of the images is one of (i) set in advance based on an operation of an operation unit by a user, (ii) automatically set by the display control unit based on images satisfying a prescribed standard from among the multiple images, and (iii) automatically set by the display control unit based on an image whose display sequence is last from among the multiple images.

9. A non-transitory computer readable recording medium having a display control program recorded thereon, the program being executable to control a computer to function as units comprising:

an image data recording unit for recording multiple image data; and a display control unit for displaying, on a display unit in a predetermined display sequence, multiple images based on the multiple image data recorded by the image data recording unit;

wherein:

the display control unit is configured to (i) perform image processing by changing various parameters that characterize features of the images, so as to change a visual style of a predetermined number of the images, and (ii) control the display unit to display at least the predetermined number of the images having undergone the image processing;

the predetermined number of the images comprises multiple images; and the display control unit changes the visual style of the images by varying a degree of change so that the degree of change of the visual style is largest for at least one of the images from among the predetermined number of the images.

* * * * *